(12) United States Patent
Rahmstorf et al.

(10) Patent No.: US 6,601,902 B1
(45) Date of Patent: Aug. 5, 2003

(54) MOTOR VEHICLE COCKPIT

(75) Inventors: Peter Rahmstorf, St Laurent du Pont (FR); Lydia Creutz, Ingwiller (FR)

(73) Assignee: Sommer Allibert-Lignotock GmbH, Rhein (DE)

( * ) Notice: Subject to any disclaimer, the term of this patent is extended or adjusted under 35 U.S.C. 154(b) by 0 days.

(21) Appl. No.: 09/554,857

(22) PCT Filed: Nov. 19, 1998

(86) PCT No.: PCT/EP98/07372

§ 371 (c)(1),
(2), (4) Date: Sep. 15, 2000

(87) PCT Pub. No.: WO99/26833

PCT Pub. Date: Jun. 3, 1999

(30) Foreign Application Priority Data

Nov. 20, 1997 (GB) .......................... 197 53 178

(51) Int. Cl.[7] .......................... B60K 37/00; B62D 25/14
(52) U.S. Cl. .......................... 296/70; 296/208; 296/189
(58) Field of Search .......................... 296/189, 70, 72, 296/208, 192

(56) References Cited

U.S. PATENT DOCUMENTS

| 2,864,590 A | | 12/1958 | Moore | |
|---|---|---|---|---|
| 3,774,713 A | * | 11/1973 | Stegmaier | 180/90 |
| 3,876,228 A | * | 4/1975 | Hawkins et al. | 180/90 |
| 4,597,461 A | * | 7/1986 | Kochy et al. | 296/72 |
| 4,663,210 A | * | 5/1987 | Schreiber et al. | 280/752 |
| 4,733,739 A | * | 3/1988 | Lorenz et al. | 180/90 |
| 4,962,961 A | * | 10/1990 | Ito et al. | 296/192 |
| 5,072,967 A | * | 12/1991 | Batchelder et al. | 280/732 |
| 5,082,078 A | * | 1/1992 | Umeda et al. | 296/70 |
| 5,198,169 A | * | 3/1993 | Abeltino | 264/137 |
| 5,333,901 A | | 8/1994 | Barnes | |
| 5,387,023 A | | 2/1995 | Deneau | |
| 5,564,769 A | * | 10/1996 | Deneau et al. | 296/72 |
| 5,580,122 A | * | 12/1996 | Muehlhausen | 296/194 |
| 5,658,652 A | * | 8/1997 | Sellergren | 296/70 |
| 5,707,100 A | * | 1/1998 | Suyama et al. | 296/70 |
| 5,938,266 A | * | 8/1999 | Dauvergne et al. | 296/72 |
| 5,997,078 A | * | 12/1999 | Beck et al. | 296/208 |
| 6,203,092 B1 | * | 3/2001 | Yoshinaka | 296/70 |
| 6,231,116 B1 | * | 5/2001 | Naert et al. | 296/70 |
| 6,305,733 B1 | * | 10/2001 | Rahmstorf et al. | 296/70 |
| 2001/0004015 A1 | * | 6/2001 | Bendell et al. | 454/141 |

FOREIGN PATENT DOCUMENTS

| DE | 2061932 | * | 4/1979 |
|---|---|---|---|
| DE | 34 47 185 A1 | | 6/1986 |
| DE | 38 06 783 A1 | | 9/1989 |

(List continued on next page.)

Primary Examiner—D. Glenn Dayoan
Assistant Examiner—H. Gutman
(74) Attorney, Agent, or Firm—Martin Fleit; Paul D. Bianco; Fleit Kain Gibbons Gutman & Bongini P.L.

(57) ABSTRACT

A motor vehicle cockpit is prefabricated and contains a flat shaped piece serving as a mounting plate for a visible shell, a heating or air-conditioning system and operational elements. An impact protection is formed by a box-section of the motor vehicle body that extends under the front edge of the windscreen and a cross-member. The impact protection is completed by the flat shaped piece that couples to the box-section and the cross-member, preferably coupled with a linear introduction of force. In the event of a vehicle frontal impact, the flat shaped piece and coupled box-section and cross-member absorb the energy of impact.

57 Claims, 5 Drawing Sheets

FOREIGN PATENT DOCUMENTS

| | | | | |
|---|---|---|---|---|
| DE | 3913622 | * | 10/1990 | |
| DE | 43 37 467 A1 | | 5/1994 | |
| DE | 44 01 022 C1 | | 2/1995 | |
| DE | 44 09 081 C1 | | 4/1995 | |
| DE | 195 27 627 A1 | | 1/1997 | |
| EP | 0141959 | * | 5/1985 | |
| EP | 0327415 | * | 8/1989 | |
| EP | 0456531 | * | 11/1991 | ............ 296/70 |
| EP | 0491261 | * | 6/1992 | |
| EP | 0607585 | * | 7/1994 | |
| EP | 0 774 309 A1 | | 11/1996 | |
| EP | 0842805 | * | 5/1998 | |
| FR | 2 106 069 | | 4/1972 | |
| FR | 2 623 776 | | 6/1989 | |
| FR | 2639008 | * | 5/1990 | |
| FR | 2 669 885 | | 6/1992 | |
| GB | 2079694 | * | 1/1982 | ............ 296/70 |
| GB | 2196108 | * | 4/1988 | |
| JP | 59-77918 | * | 5/1984 | |
| JP | 63-38016 | * | 2/1988 | ............ 237/28 |
| JP | 1-111576 | * | 4/1989 | |
| JP | 1-145279 | * | 6/1989 | ............ 296/192 |
| JP | 1-156182 | * | 6/1989 | |
| JP | 3-5284 | * | 1/1991 | ............ 296/192 |
| JP | 5-294257 | * | 11/1993 | |
| JP | 6-278653 | * | 10/1994 | |
| JP | 9-118129 | * | 5/1997 | |
| JP | 2001-294035 | * | 4/2000 | |

* cited by examiner

MOTOR VEHICLE COCKPIT

BACKGROUND OF THE INVENTION

The invention relates to a cockpit.

In the current state of the art, motor vehicle cockpits are complex systems adapted to the vehicle type, which generally consist of a cross-member, the air conduction elements, a shell construction, which predetermines the visible side of the cockpit, operational elements and a passenger airbag. In DE 34 47 185 A1 and in EP 0 515 287 A1, cockpits of this type are described. The objective here is to create constructional units which are pre-assembled as far as possible and are tested in respect of their function before being fitted into the vehicle and which can possibly also contribute to stiffening of the motor vehicle body. Solutions of this type are vehicle-specific, i.e. are suitable in construction and production only for a specific type of vehicle. DE 36 11 486 A1 describes a solution which is suitable for retrofitting or converting the safety standard with lower outlay in a specific type of vehicle. The cross-member of this system is admittedly simplified but can still be used for a vehicle type. In the older, not prior-published application DE 196 26 441 is described a cockpit, the cross-member of which consists in modular fashion of components which are predominantly no longer vehicle-specific and which can therefore be used for a plurality of vehicle types. In this design, the air conduction system is a component of the cross-member, thus producing a complex construction which requires -additional outlay for connecting the air conduction system to the visible shell of the cockpit, for example noise and heat insulation. In one design, provision is made for the housing of the heating or air conditioning system also to be an integral component of the cross-member, whereby joints are produced which can impair the function of the cross-member as stiffening for the vehicle body. Moreover, in this case, the housing must be able to absorb corresponding forces, i.e. be over-dimensioned in relation to the original purpose, which is not an optimum solution both in respect of production and also in respect of weight.

In DE 44 45 381 A1 is described a cockpit with which are associated two cross-members disposed the one behind the other. The front member in the direction of travel here runs in the interior of the motor vehicle body below the front windscreen, the second cross-member carries, as is also usual, the actual cockpit which contains the pre-tested operational and functional elements.

Although not referred to in DE 44 45 381 A1, the use of two cross-members has safety advantages in a frontal impact. This aspect is referred to by DE 195 27 627 A1, in which an integrated safety member for cab-over-engine lorries or buses is described, which serves as a basis for the dashboard. Here, a front cross-member again runs in the interior of the car body below the front windscreen; the second cross-member on the driver's side is connected to the first by bars which run parallel to the direction of travel to form a safety member, the bars being intended to act as energy-absorbing deformation elements. Both publications refer to snub-nosed vehicles which have increased safety requirements in a frontal impact, since there is no crumple zone. DE 44 45 381 A1 has only a low safety advantage, since the two cross-members are "de-coupled", i.e. do not form any additional crumple zone.

In DE 195 27 627 A1, the coupling does exist but the alignment of the coupling bars parallel to the direction of travel involves the danger that if one of the bars is torn away, it could come towards the occupants like a dagger, with the corresponding risk of injury.

SUMMARY OF THE INVENTION

The object of the present invention, therefore, is to quote a vehicle cockpit which can be pre-assembled and pre-tested and which is suitable in vehicles with a cross-member running underneath the front windscreen with simplified construction and defined stability behaviour, to be more of an active component of an occupant protection system in the case of a frontal impact than previously provided.

Because, at least between the box-section and the cross-member, a flat-shaped piece, also referred to and considered as a structural planar profiled member, is mounted as a mounting plate for the functional and operational elements, which piece couples the box-section and the cross-member in the event of a frontal impact, in an energy-absorbing manner, the following advantages arise.

A shaped piece of this type is an excellent mounting platform for functional and operational elements, much more variable than for example the arrangement of these elements only on the cross-member, as in prior art (see FIG. 5). Moreover a platform-shaped piece of this type can, if it is designed expediently of deformable materials, absorb impact energy through deformation, and can connect box-section and cross-member to one another in linear fashion over the whole width of the vehicle to form an enclosed safety system, in which the total intermediate space between box-section and cross-member is used for energy absorption, and in which above all the danger of being injured by torn-off coupling elements, which are arranged in the direction of the interior space, disappears.

An expedient design consists for example in the flat shaped piece having stiffening ribs which are oriented in a particularly advantageous manner in their plurality approximately parallel to the cross-member. In this case, the stiffened and thus more energy-absorbing surface regions are deformed in chronological succession, the impact time being thereby lengthened and the acceleration force being reduced.

It is also advantageous if the cross-member is integrated as a constructional unit in the shaped piece, i.e. is produced in common with the shaped piece. Manufacturing and handling such a shaped piece and the whole cockpit are thus considerably simplified. A good possible way of integrating the cross-member in the shaped piece is the embodiment as a metal-plastics material-hybrid construction; naturally in this technology, the production of only the flat shaped piece is also possible and possibly expedient. A further advantageous design possibility is a corresponding embodiment as a sheet metal preform, for example like a corrugated plate or one with trapezoidal corrugations. With a sheet metal preform, the cross-member can also be integrated as a constructional unit.

As a result of the unavoidable tolerances of the body shells, the possibility of tolerance balancing during the fitting of a cockpit module is indispensable. Prior art here offers a large number of possible systems, partially with the disadvantage that the connection between the cockpit and motor vehicle body is a weak point. In the cockpit, a weak point of this type can be avoided if at least the cross-member, in an integrated design of the whole element, is secured in the region of the A-columns with the aid of tolerance-balancing sloping surfaces. These sloping surfaces abut against corresponding sloping surfaces on the A-columns, to which they can be secured. The overall securing of the cockpit, trapezoid in the plan view, makes possible both compensation of the width tolerance of the bodywork and also here a whole-surfacing bearing surface for the fastening shackles.

The flat shaped piece according to the invention is so to speak a natural parting plane between the elements of the foot space and those of the actual cockpit side. If one disregards a large number of elements of the cockpit, such as for example indicating and control instruments, airbag, switches etc., which can be pre-assembled not on the cross-member, as in prior art, but more simply on the shaped piece, i.e. the natural parting plane, because the surface offers better opportunities for arrangement than the "line" of a cross-member, the parting plane of the shaped piece divides the main components of a pre-assembled cockpit in a clearer manner than previously.

On the upper side of the shaped piece is securely mounted an air distribution system, whilst a heating and/or air-conditioning appliance is securely connected to the opposite side of the foot space. In this arrangement, no flexible connections of any kind are needed any longer between the heating and/or air-conditioning appliances. Moreover, if the housing of the heating and/or air-conditioning appliance is constructed self-supporting and stable, this unit can be used as an additional support of the cockpit on the vehicle floor. The shaped piece between the box-section and the cross-member offers at its lower side so much space that even a constructional unit which comprises the steering column, the pedals and a sealable opening for the cable harness from the engine side, can be accommodated there. This constructional unit is pre-assembled on the lower side of the shaped piece with the aid of metal-rubber elements (rubber-metal connections) and can thus compensate for fitting tolerances. After being fitted, the complete unit is fixed to the front panel of the passenger space, preferably by screws. Steering and brake boosters can be integrated into this fitted unit on the engine side. On the passenger side, a complete glove compartment unit with cover flap and possible additional fittings can be secured in the same manner to the lower side of the shaped piece, this solution clearly offering more space than the usual prior art. The assembly possibility for the foot space subassemblies can be further improved by the shaped piece having on its lower side moulded-on, inclined mounting surfaces which can also be designed symmetrically to the longitudinal axis of the vehicle, in order to be able to use the same shaped pieces for example for right-hand drive vehicles.

Since the flat shaped piece makes it possible to pre-assemble and arrange optimally all the functional and operational elements, the visible shell, which determines the appearance of the interior of the vehicle, can have a solely covering function. It can consequently be optimised in respect of weight and be designed easily exchangeable, for example in order to take into account a plurality of equipping variants.

However, it is also possible, and in many cases advantageous, not to mount the air distribution system on the shaped piece, but to use the visible shell itself for the conduction air. This can be realized by two thin shaped shells being connected to one another. These shaped shells which predetermine the air conduction system are covered by a voluminous rigid foam and connected by the same. The moulded body determines the appearance of the cockpit and simultaneously good heat and sound insulation. This shell can be removed quickly and easily since it is not connected to the bodywork but only to the shaped piece and/or the cross-member. The operational and functional elements mounted on the shaped piece are then easily accessible; the maintenance of these elements and converting or refitting the cockpit is in this "construction from inside to outside" just as easily possible as with only a covering visible shell; similarly an alteration of the styling by simple changing of the visible shell whether within a series as a variant or for refitting with a change of user's habits. The surface of the visible shells is, in accordance with prior art, determined by a foam-backed foil, by a slush skin or by a leather lining. All surface variants can be realized in the same production plant, such that with a construction of this kind of the visible shell, all the requirements of the designers can be met.

An embodiment of the visible shell of the cockpit system, which is advantageous in respect of weight, function and production, arises with the following construction: a support shell formed from a standard material for this purpose, for example from a wood-fibre material, carries the air conduction system formed from thin shaped shells. The shaped shells are in this case metal pressed parts, without this being absolutely necessary. Moulded shells formed from hard plastics material would be equally suitable. Particularly in the metal embodiment, the air conduction system stiffens the visible shell and guarantees sufficient dimensional stability. The air conduction system is covered with a moulded body which consists of dimensionally stable polyurethane particle foam, and is connected flat thereto. The visible side of the moulded body is covered with a lining foil which is underfaced by a flexible foam layer, in order to produce sufficient grip in the surface. A visible shell structured in this manner can be realized in a tool in a plurality of feeding steps, beginning for example with the vacuum forming of a foam-backed lining foil. The use of polyurethane particle foam for the moulded body contributes to a reduction of the cycle time, since the development time of other foam systems is usually longer. If the support shell consists of a shaped wood-fibre material, the advantage is produced that the air permeability of this material favours trouble-free foam development.

If the visible shell contains a guide channel, formed by foamed-in parts, for the passenger airbag, the airbag can be secured separately from the visible shell to the shaped piece, which makes removing or changing the visible shell easier. The guide channel of the passenger airbag can be covered with the usual flap systems. It is particularly advantageous to design this cover in a single work cycle with the production of the invisible shell as an "invisible" covering.

According to the invention, the visible shell is separate from the motor vehicle body, i.e. it is only secured to the shaped piece and/or to the cross-member. Thus it is for example possible to arrange the visible shell pivotable. For example, in the event of a frontal impact, the visible shell can swing out together with a steering column also swinging upwards. The safety of the occupants can be additionally improved here by an invisible shell being used which is divided into an upper and a lower shell, the upper shell being fastened pivotable and in the event of a frontal impact of a pre-determined strength being released by a sensor and swung in front of the front windscreen such that, with a suitable shaping, both the protection for the occupants' heads can be improved and during the swivel movement an aperture for a passenger airbag can be cleared, without the danger potential of conventional flaps which can be torn away, the torn away parts then being hurled into the passenger space. In this solution, the lower shell remains stationary as knee protection. This increase in safety is rendered possible by the air conduction systems being an integral component of the visible shell and therefore no complicated connectors are required which can make the swivel movement more difficult. The air conduction system can here lie with central apertures directly, i.e. without interfering intermediate members, on corresponding apertures of the heating or air-conditioning system, in a sealed manner, such that all the elements of the air conduction system pointing towards the inner space can be integrated completely ready-made into the invisible shell.

If divided visible shells are used, the upper shells of which can be swung in front of the windscreen, it is advantageous to release this swivel movement through the unfolding passenger airbag itself. In this case, its sensor can also be used for the pivoting of the invisible shell, and the inflation of the airbag is moderated. The pivotable upper shell can then lock in its open position.

The protective effect of the swivelled upper shell can be further improved if, in the region of a possible head impact, an inflatable air hose is disposed between the rigid-foam body and the lining backed with flexible foam. In the event of a frontal impact, an additionally protecting padded region can be created, triggered by a sensor. Since the lining is limited in its capacity to expand, folds inserted into the rigid-foam body which are drawn out as the air hose is inflated, ensure that the air hose can be inflated sufficiently far. But also pre-weakened tear seams, such as are known from covering system for "invisible" airbags, can be used in order to ensure the expandability of the safety hose.

The standard housing for the air-conditioning or heating assemblies belonging to the cockpit system, is configured self-supporting, and not only in respect of its supporting function for the whole cockpit. It can be designed independently of the type of vehicle and accommodates all the components of the heating or air-conditioning system, such as for example ventilators, ventilator motors, heat exchangers and filters.

The filters are here arranged on the standard housing in such a way that their maintenance region protrudes freely into the engine compartment through an aperture in the front panel and is easily accessible there. Alternatively, the maintenance region of the filters can also protrude into the C-shaped stiffening box of the bodywork and be accessible there through a closable aperture.

Particularly advantageous is a sub-division into a fan unit disposed on the side of the engine compartment, which unit contains, combined in one housing, the fan motor, the filer and the control valve for circulating air/fresh air, and an air-conditioning unit which helps with the support function of the cockpit on the passenger side, as described. The fan unit on the side of the engine compartment can here also be disposed on the construction unit and pre-assembled, and be located on the steering column and the pedals.

The air-conditioning unit can be expediently divided up into functional planes which respectively contain similar functions arranged together on boards, intermediate bases and/or inserts.

For example the functional planes
heat exchanger with heat register and possibly evaporator
air flow regulation and
air distribution
can be disposed vertically one above the other, and by standardizing the dimensions of fan portion and air-conditioning portion and by the possible exchange of differently acting functional planes, both the production can be cheapened and simplified and a large number of requirements can be taken into consideration.

The upper side of the C-shaped bodywork box of the safety system can, in a simple manner, be used to drain the water from the front windscreen. This ensures that the C-shaped stiffening box of the bodywork does not represent any impairment of the bodywork function.

Other applications of the present invention will become apparent to those skilled in the art when the following description of the best mode contemplated for practicing the invention is read in conjunction with the accompanying drawings.

BRIEF DESCRIPTION OF THE DRAWINGS

The invention will now be described in greater detail with the aid of embodiments represented in the figures.

These show.

DESCRIPTION OF THE PREFERRED EMBODIMENT

Figure 1:
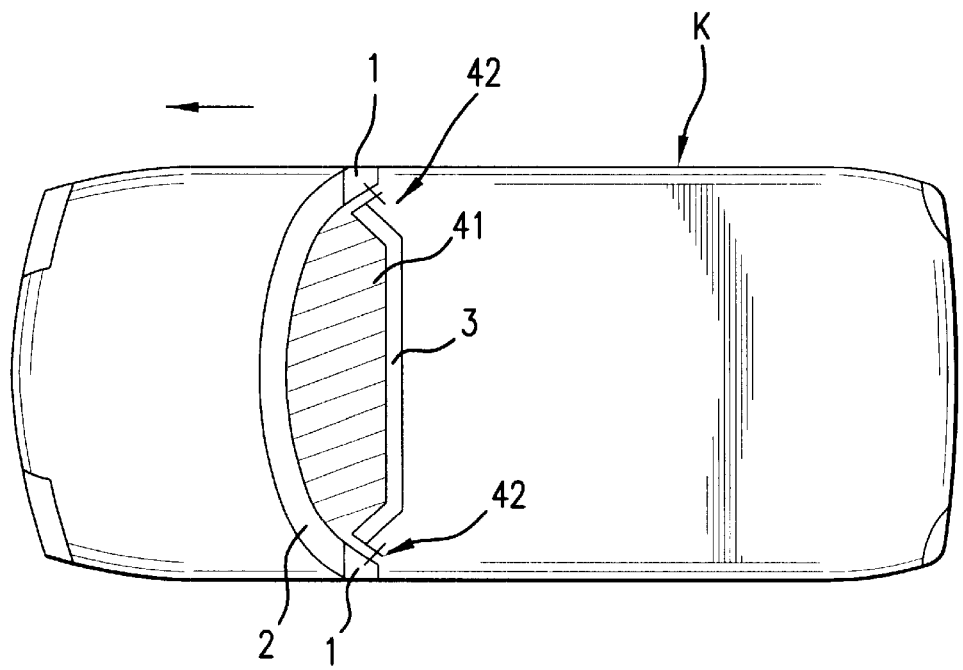
FIG. 1 schematically, the arrangement of the safety system formed from the box-section, the A-columns, the cross-member and the flat shaped piece, FIG. 2 an embodiment of the shaped piece.

In FIG. 1 the bodywork represented schematically in outline is referred to as K. The arrow shows the direction of travel. The A-columns 1, the preferably C-shaped box-section 2 of the body work, running under the lower edge of the windscreen, and the cross-member 3 form together with the flat shaped piece 41 the safety system in the event of a frontal impact, but also, on account of the inclusion of the A-columns in the annular stiffening, protect the occupants in addition to other measures against lateral impact.

The cross-member 3 is connected with the aid of sloping surfaces 42 to the A-columns, compensating tolerances.

Figure 2:
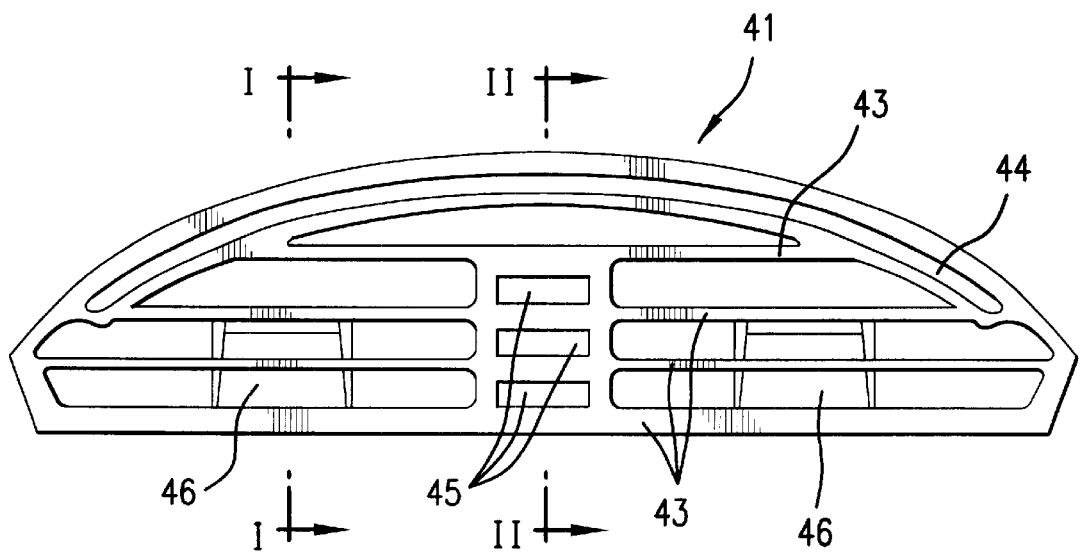

The flat shaped piece 41 is represented in plan view in FIG. 2. The stiffening ribs 43 run transversely with respect to the direction of travel, i.e. parallel to cross-member 3. In the event of a frontal impact, they are deformed in chronological succession in this arrangement and thus lengthen the period of energy absorption. The openings 45 serve as air inlets from the heating and/or air-conditioning assembly (H in FIG. 8) to the air conduction system (142 in FIG. 8). The shaped piece 41 has, towards the foot space, protrusions 46 to which for example the steering column and the glove compartment can be secured. The guide channel 44 serves to receive a cable harness.

Figure 3:
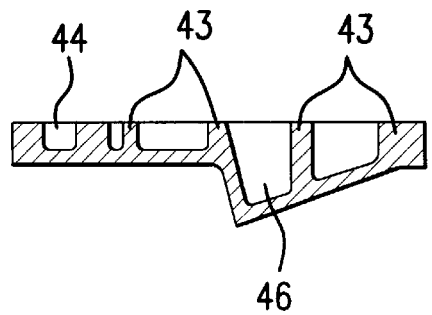
FIG. 3 shows the cross-section I—I of the shaped piece according to FIG. 2.
Figure 4:
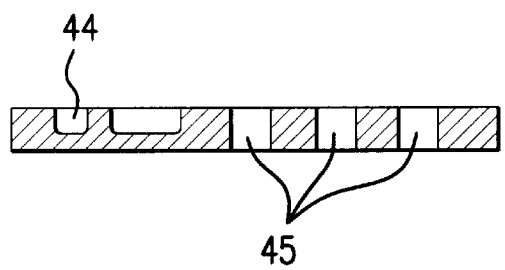
FIG. 4 shows the cross-section II—II of the shaped piece according to FIG. 2, FIG. 5 a cross-member system according to prior art, in exploded view, FIG. 6 schematised cross-sections through a cockpit at different points; using the shaped piece according to FIG. 2, FIG. 7 schematised cross-sections through a cockpit at different points; using the shaped piece according to FIG. 2, FIG. 8 a schematised cross-section through a cockpit in the region of the heating and air-conditioning assembly, in the example of a shaped piece embodied in sheet metal with an integrated cross-member, FIG. 9 the fan part of the air-conditioning assembly for a schematised perspective view.

FIGS. 3 and 4 complete the representation of FIG. 2 with the aid of sections I/I and II/II.

Figure 5:
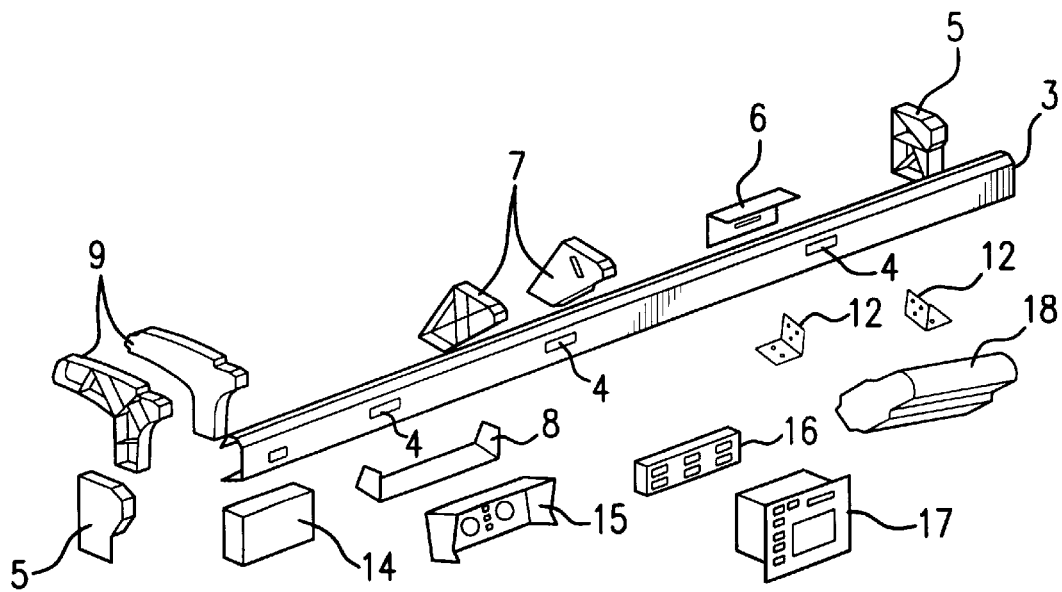

FIG. 5 shows, by way of comparison, a standard cockpit system in which the functional and operational elements are exclusively secured to a cross-member. The cut-outs 4 serve to guide the cable harnesses; they can be designed as simple apertures or be fitted with plug connections in which the cables end. To the cross-member system also belong the fastening elements 5 for securing the cross-member 3 to the A-columns of the bodywork, the steering column suspension 9 and the securing system 7 for suspending the carrying box of the heating or air-conditioning system. These elements have higher demands made of them in respect of strength; they are therefore designed ribbed. The securing device 8 for a combination of instruments 15, the suspension 6 of the glove compartment and the angle bracket 12 for the airbag 18 are sheet metal angle brackets; their load is less such that they can be designed lighter and simpler. The operating panel 16 for the heating or air-conditioning system and the electronic path-finding system 17 are secured to the non-depicted air-conditioning system, and the central electronics 14 is hinged directly to the cross-member.

FIG. 5 shows strikingly that the arrangement of the operational and functional units belonging to a cockpit system on a flat shaped piece according to FIG. 2, is possible in a substantially simpler manner and with less outlay, and that therefore a structure of the cockpit according to the invention offers not only safety advantages but also constructional ones.

Figure 6:
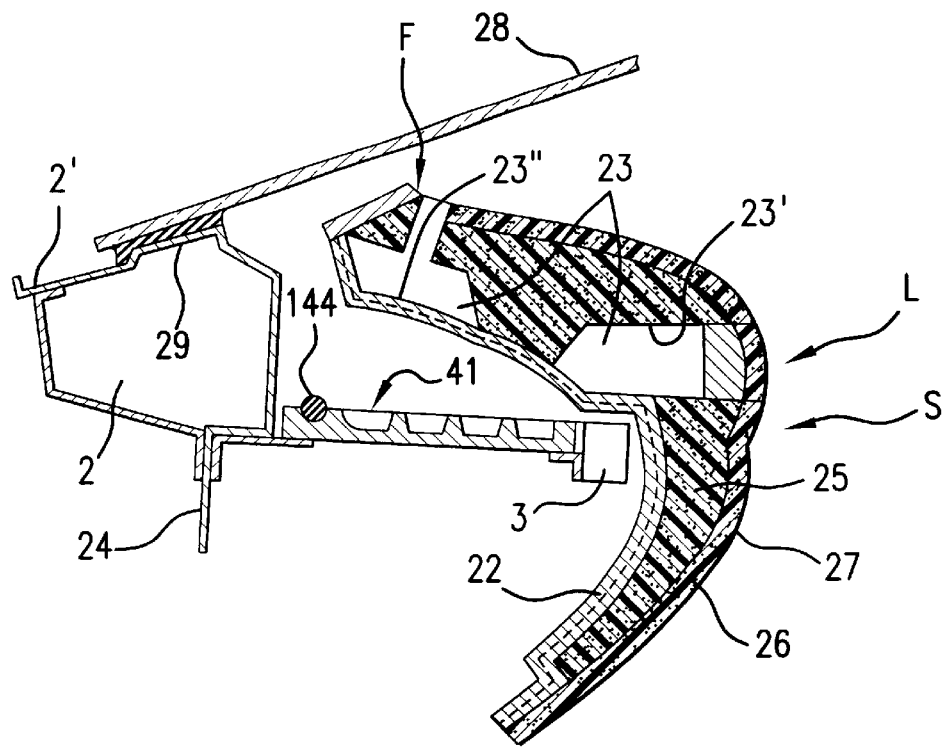
Figure 7:
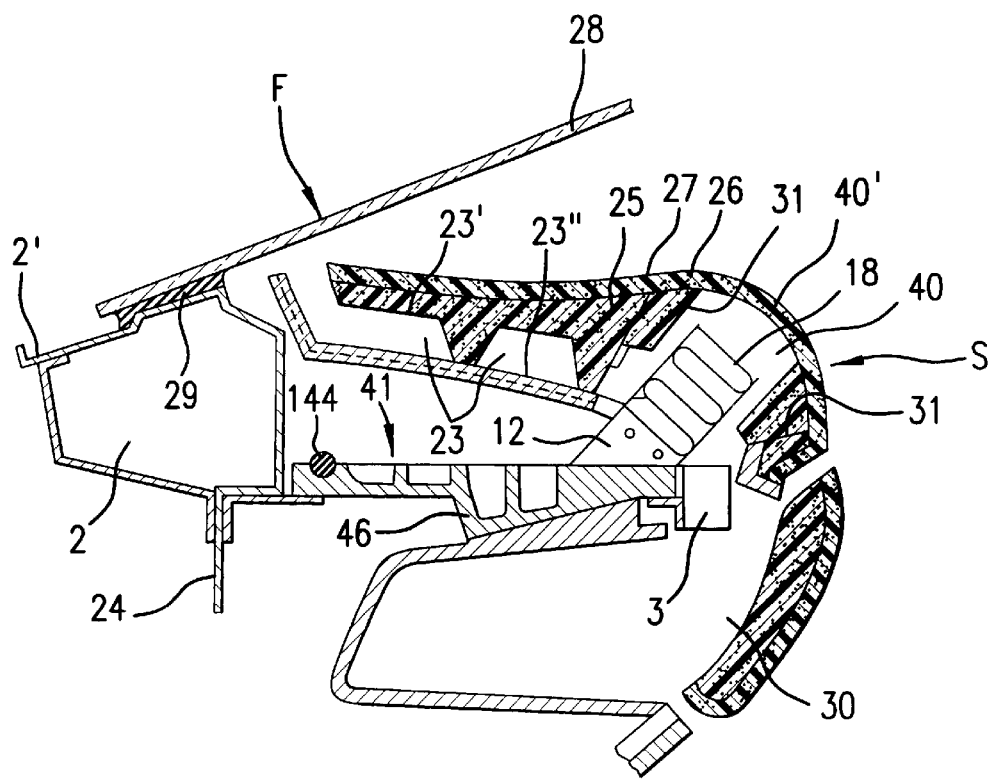

FIGS. 6 and 7 show the cockpit according to an embodiment of the invention in schematic cross-section. In FIG. 6, which shows the proportions in the outer region of the cockpit, the cross-member 3 and the flat shaped piece 41 can be recognized, a combination which carries the visible shell S, formed from the support shell 22, the sheet metal shells 23' and 23" for the air conduction channels 23, the particle foam body 25 and the lining foil 27 under-faced with the flexible foam 26 (the fastening of the visible shell S to the cross-member 3 and the flat shaped piece 41 is not represented for reasons of better clarity). The air exit nozzles are referred to as L and F. The support shell 22 consists for example of a moulded wood-fibre material, the particle foam body 25 of blown polyurethane balls. The front wall/floor 24 of the spassenger area or space P is completely by the box-section 2, which has on its upper side the water channel 2' which takes water away from the windscreen 28, which is connected to the box-section 2 with the aid of seal 29.

FIG. 7 is a section in the region of a passenger airbag 18 and the glove compartment 30. For the airbag 18, the visible shell S (the individual elements of which bear the same reference numbers in FIGS. 6 and 7) contains a guide channel 40 formed from the metal shaped parts 31, and foamed into the particle foam body 25, which channel is secured to the shaped piece 41 with the aid of the angle brackets 12. The covering 40' of the guide channel 40 is designed as an "invisible" covering, but can also correspond to any other design according to prior art. The glove compartment 30 is secured as a complete functional unit to the protrusion 46 of the shaped piece 41, and the cable harness 144 is guided in channel 44 at the front. The embodiment of the flat shaped piece 41, shown in FIGS. 2 to 4 and 6 and 7, can be an injection-moulded part, expediently fibre-reinforced. But embodiments as a plastics material-metal-hybrid composite or as light metal forged parts are also possible.

Figure 8:
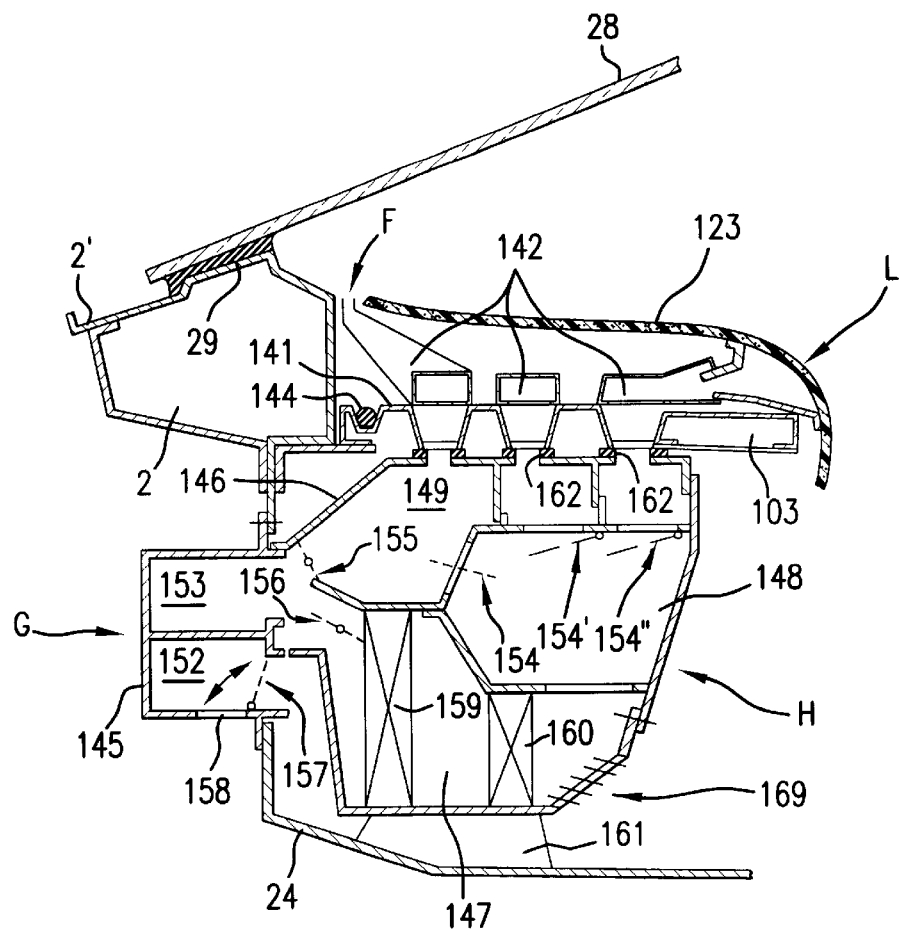

FIG. 8 shows a section through a cockpit according to the invention, in which the shaped piece 41 is configured as a sheet metal shaped part 141, which contains the cross-member 103 integrally. Moreover, the airflow system is no longer integrated in the visible shell 123, which only has covering function, but in the box-shaped air conduction system 142, which is mounted on the upper side of the shaped part 141. The heating and/or air-conditioning system H is hinged to the lower side of the shaped part 141 and sealed with the aid of seals 162. The heating and air-conditioning system H consists of the housing 146, which is supported by means of support 161 against the front wall/floor 24 and therefore simultaneously supports the whole cockpit. The heating housing 146 can be designed independently of the type of vehicle, preferably in a cuboid shape and be adapted to the vehicle type by special supports 161. The housing 146, disposed towards the passenger space P, contains the functional plane 147 with the heating register 159 and the evaporator 160. Functional plane 148 controls the air distribution by means of throttle valves.

The throttle valves 154, 154', 154" here adjust the flow of air to the defroster nozzles, the side ventilation or the central ventilation. The foot space is heated by means of the grid 169 directly from the functional plane 147.

The whole functional plane 148 is configured as an insert, after the removal of which the inner space of the housing 146 is accessible for checking. Finally the air conduction plane 149 is the upper end of the housing 146, which communicates in a sealed manner directly with shaped openings 45 (FIG. 2). The throttle valves 155 and 156 predetermine whether the flow of air, as represented, is led through register 159 and evaporator 160 and conditioned, or whether non-tempered air is used.

Figure 9:
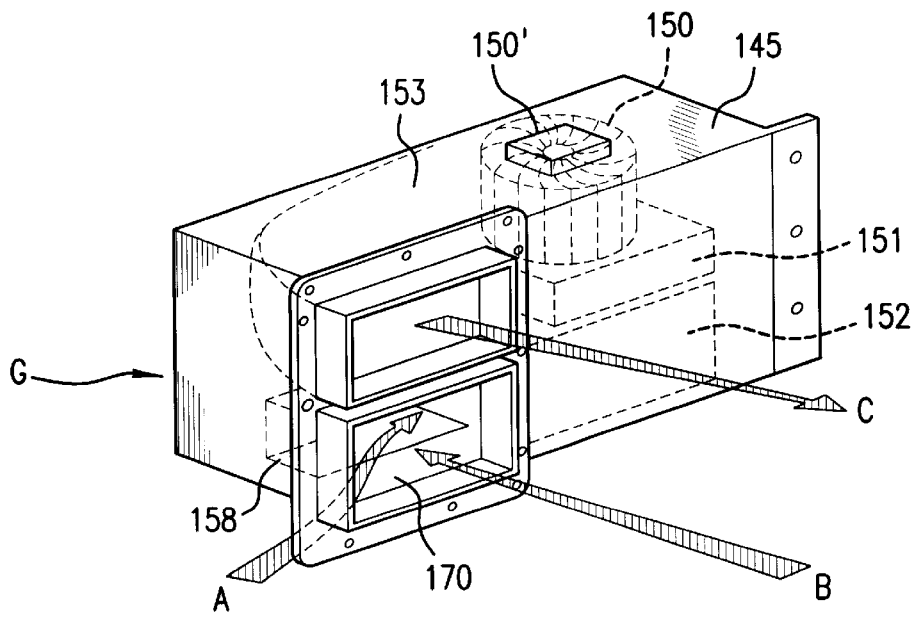

The fan unit G belonging to the air-conditioning system H is flanged to the front wall/floor 24 on the side of the engine compartment E. In the housing portion 145, which is divided into suction plane 152 and blowing plane 153, the fan 150, fan motor 150' shown schematically, the filter 151 and the distribution valve 157 are accommodated. FIG. 9 explains, with the aid of a perspective view, the air conduction system in the fan unit G: the distribution valve 157 (not represented in FIG. 9 but recognizable in its function from FIG. 8) covers either the fresh air aperture 158 (air-circulating operation of the air-conditioning system; fresh air A is blocked out) or makes possible optionally the entry 170 of the fresh air A (fresh air operation of the air-conditioning system). Circulated air B of fresh air A flow through the filter 151 and are supplied by the fan 150 as additional air C to the air-conditioning system H. In this arrangement, the maintenance of the filter 151 is possible in a simple manner from the engine compartment E.

Figure 10:
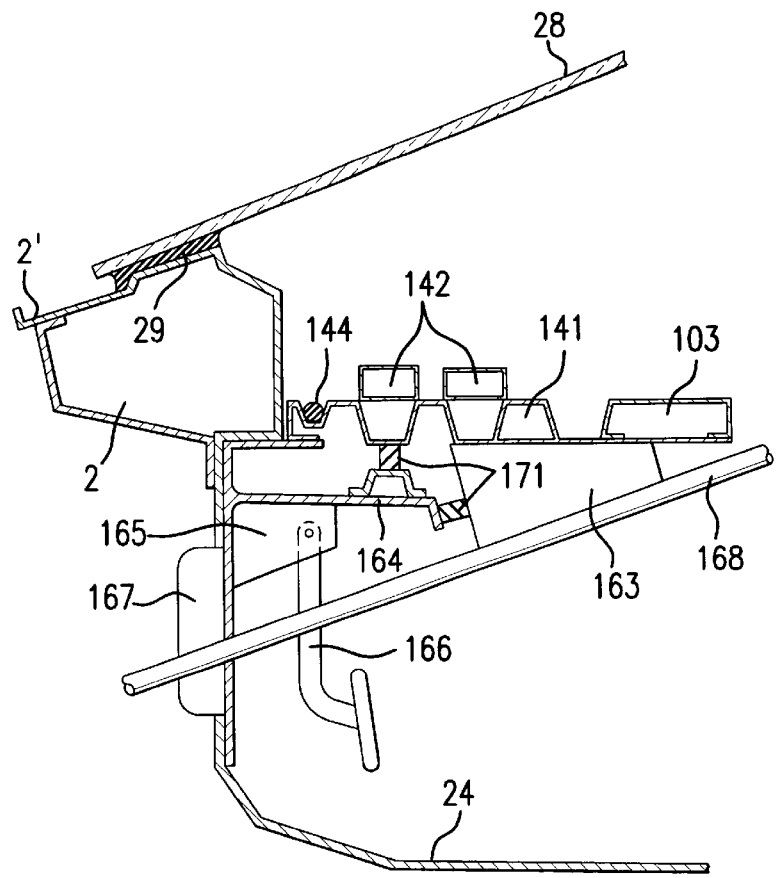
FIG. 10 a schematised cross-section through a cockpit in the region of the pedals and the steering column, also in an example of a shaped piece in a metal embodiment with integrated cross-member, and FIG. 11 in simplified view, a flap-down visible shell for improved protection in the event of a head impact.

FIG. 10 shows a section through a cockpit the plane of the steering column. With otherwise identical designation of the individual elements, in FIG. 10 the steering column is referred to as 168 and the pedals as 166 (only one pedal is represented). The steering column 168 is connected to shaped part 141 and cross-member 103 by the column carrier 163; the pedals 166 are mounted on the angular support part 164, with the aid of corner pieces 165 which simultaneously stiffen the support part 164. The support part 164 is pre-assembled by means of the metal rubber connections 171 resiliently on shaped part 141 and on the steering column carrier 163; fitting tolerances are thus able to be corrected and, after the fitting of the pre-assembled and pre-checked entire cockpit, are fixed by screws in the position shown in FIG. 10, the cockpit covering a cut-out of the front wall/floor 24, through which possibly steering and brake boosters, drawn in together in FIG. 10 under the reference number 167, engage in the engine compartment E.

The support part 164 can, as usual, be sealed from the front wall/floor 24; similarly it is expedient to guide the main cabling in an edge cut-out of the support portion 164 Into the interior space in order to avoid complicated "threading" of the main cabling. Representation in drawing in FIG. 10 of both these measures is dispensed with for reasons of clarity.

Figure 11:
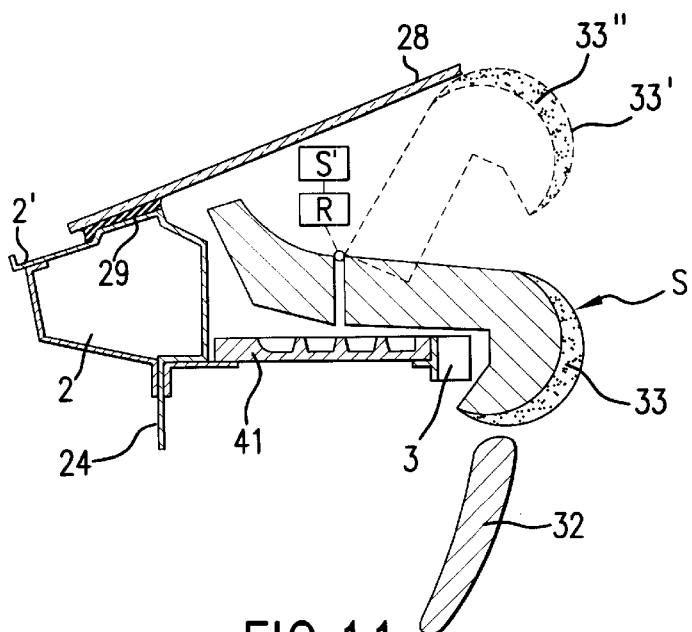

Finally, FIG. 11 explains the possibility of using a divided visible shell S as protection against impact. The upper portion 33 of the visible shell S is fastened able to be flapped down. The inner structure of the visible shell S (air conduction, air exit nozzles) is not represented, for the sake of clarity. The upper portion 33 has advantageously below the lining an inflatable region 33" (an inflatable air hose). A stationary lower portion 32 of the visible shell S serves as knee protection in the event of a frontal impact. In a frontal impact, the flap movement of portion 33 (referred to in the upper position as 33') of the visible shell S is released by activation of a sensor S' that initiates release mechanism R and the inflatable region 33" is blown up to form a cushioning region of portion 33', which then lies in the impact region of the head of the passenger in front of the windscreen 28. In order not to hinder inflation of this region, it can be expedient to provide here a system of tear seams 127 in the lining, for example cross-sectional weakening of the lining foil. During the swivel movement of the upper portion 33 into the position 33', shown in a broken line, in front of the front windscreen 28, a broad aperture for an airbag (not shown) to pass through becomes free, which could be designed for example cylindrical. The swivel movement of the upper portion 33 can be actuated by a special auxiliary device which is triggered by a sensor. Expediently, however, it can also come about by the passenger airbag unfolding. In this case, the mass inertia of the upper portion 33 counteracts too quick an unfolding of the airbag. The swivel movement of the upper portion 33 of the visible shell S can also be used to swivel the steering wheel upwards with it, the steering column being able to have a corresponding pivot point. By this means, the impact conditions in the region of the steering wheel are improved. Since in the cockpit according to the invention, the visible shell is not securely connected to the bodywork, no basic difficulties arise for the realization of a pivotable visible shell or a pivotable portion of the same.

What is claimed is:

1. A vehicle cockpit in a motor vehicle having a length and a width and a rear passenger area and a forward engine compartment divided by a front wall, a front windscreen above the front wall and a bodywork including a box section coupling the windscreen to the front wall, a cross member spaced rearwardly into the rear passenger area from the box section, the box section and the cross member lying in a common horizontal plane and defining a horizontal space therebetween extending over the width of the vehicle, the cross member together with the box section forming a closed structural system in said horizontal plane, a structural planar profiled member deformable on frontal impact, in an energy absorbing manner, having a front edge and a rear edge, the structural planar profiled member having an upper surface and a lower surface and having a width that extends over the width of the vehicle substantially occupying the horizontal space defined between the box section and the cross member and lying in said horizontal plane therewith, the rear edge of the structural planar profiled member coupled over the width of the structural planar profiled member to the cross member and the front edge of the structural planar profiled member coupled over the width of the structural planar profiled member to the box section to constitute thereby a part of said closed system that is used for energy absorption the structural planar profiled member defining a plurality of parallel stiffening ribs extending widthwise that are deformable to produce the energy absorption in chronological succession, the structural planar profiled member constituting a mounting platform, and a plurality of cockpit functional and operating elements mounted on said structural planar profiled member.

2. A vehicle cockpit according to claim 1 wherein the structural planar profiled member is composed of a metal-plastic hybrid construction.

3. A vehicle cockpit according to claim 1 wherein the structural planar profiled member is a sheet metal preform having corrugations as the stiffening ribs.

4. A vehicle cockpit according to claim 1 wherein the cross member is integrally formed with the rear edge of the structural planar profiled member and is coupled to the bodywork of the vehicle via tolerance balancing sloping surfaces.

5. A vehicle cockpit according to claim 1 wherein the rear passenger area includes a lower space and an upper space and the structural planar profiled member forms a parting plane between the lower space of the passenger area and the upper space of the passenger area.

6. A vehicle cockpit according to claim 1 wherein the cockpit functional and operating elements include an air distribution system mounted on the upper surface of the structural planar profiled member and an air conditioning system mounted on the lower surface of the structural planar profiled member, and the structural planar profiled member defines an opening providing air flow communication between the systems.

7. A vehicle cockpit according to claim 6 wherein a floor is provided in the vehicle and the air conditioning system is further supported on the floor of the vehicle.

8. A vehicle cockpit according to claim 6 wherein the front wall of the vehicle is provided with an opening and a portion of the air conditioning system projects through the opening in the front wall to enable servicing of the air conditioning system from the engine compartment.

9. A vehicle cockpit according to claim 8 wherein the air conditioning system includes a filter.

10. A vehicle cockpit according to claim 6 wherein the air distribution system is comprised of two thin shaped shells that are interconnected by a rigid foam body.

11. A vehicle cockpit according to claim 1 wherein a constructional unit including a steering column is mounted on the lower surface of the structural planar profiled member via metal-resilient connections.

12. A vehicle cockpit according to claim 1 wherein one of the functional and operating elements is a glove box that is secured on the lower surface of the structural planar profiled member.

13. A vehicle cockpit according to claim 1 wherein one of the functional and operating elements is a visible shell for the cockpit that is secured on the upper surface of the structural planar profiled member.

14. A vehicle cockpit according to claim 1 wherein an airbag is mounted on the upper surface of the structural planar profiled member.

15. A vehicle cockpit according to claim 14 wherein a visible shell is mounted on the upper surface of the structural planar profiled member and conceals the air bag.

16. A vehicle cockpit according to claim 15 wherein said visible shell defines a rupturable covering for deployment of the air bag.

17. A vehicle cockpit according to claim 15 wherein the visible shell includes a stationary part and a hinged movable part, the movable part concealing the air bag.

18. A vehicle cockpit according to claim 17 further including a sensor for sensing said frontal impact, and a release mechanism, being actuated responsive to the sensor sensing said frontal impact of a pre-determined strength, to release and enable pivoting of the movable part of the visible shell to facilitate the deployment of the air bag.

19. A vehicle cockpit according to claim 18 wherein the movable part, when pivoted, is positioned behind the windscreen and in front of the passenger area in the vehicle.

20. A vehicle cockpit according to claim 19 further including an inflatable air hose located in the movable part of the visible shell that deploys when the air bag is deployed.

21. A vehicle cockpit according to claim 17 wherein the visible shell extends vertically and the stationary part is a lower part and the movable part is an upper part hinged to the stationary part.

22. A preassembled vehicle cockpit for installation and assembly into a motor vehicle having a rear passenger area and a forward engine compartment divided by a front wall, a front windscreen above the front wall and a bodywork including a box section coupling the windscreen to the front wall, a cross member spaced rearwardly into the passenger area from the box section, the box section and the cross member lying in a common horizontal plane and defining a horizontal space therebetween extending over a width of the vehicle, the cross member together with the box section forming a closed structural system in said horizontal plane, the preassembled vehicle cockpit comprising a structural planar profiled member deformable on frontal impact, in an energy absorbing manner, having a front edge and a rear edge, the structural planar profiled member having an upper surface and a lower surface and having a width to extend over the width of the vehicle so that when installed in the vehicle, the structural planar profiled member will lie in said horizontal plane with the box section and cross member and will substantially occupy the horizontal space defined between the box section and the cross member, with the rear edge of the structural planar profiled member coupled over the width of the structural planar profiled member to the cross member and the front edge of the structural planar profiled member coupled over the width of the structural planar profiled member to the box section to constitute thereby a part of said closed system so that the horizontal space defined between and including the box section and cross member in said horizontal plane will be used for energy absorption, the structural planar profiled member defining a plurality of parallel stiffening ribs extending widthwise that are deformable in chronological succession, the structural planar profiled member constituting a mounting platform, and a plurality of cockpit functional and operating elements mounted on said structural planar profiled member.

23. A preassembled vehicle cockpit according to claim 22 wherein the structural planar profiled member is composed of a metal-plastic hybrid construction.

24. A preassembled vehicle cockpit according to claim 22 wherein the structural planar profiled member is a sheet metal preform having corrugations as the stiffening ribs.

25. A preassembled vehicle cockpit according to claim 22 wherein the cross member is integrally formed with the rear edge of the structural planar profiled member to be coupled to the bodywork of the vehicle via tolerance balancing sloping surfaces.

26. A preassembled vehicle cockpit according to claim 22 wherein the structural planar profiled member, when installed in the vehicle, forms a parting plane between a lower portion of the passenger area and an upper portion of the passenger area.

27. A preassembled vehicle cockpit according to claim 22 wherein the cockpit functional and operating elements include an air distribution system mounted on the upper surface of the structural planar profiled member and an air conditioning system mounted on the lower surface of the structural planar profiled member, and the structural planar profiled member defines an opening providing air flow communication between the systems.

28. A preassembled vehicle cockpit according to claim 27 wherein, when installed in the vehicle, the air conditioning system is further supported on a floor of the vehicle.

29. A preassembled vehicle cockpit according to claim 27 wherein, when installed, a portion of the air conditioning system projects through an opening in the front wall of the vehicle to enable servicing of the air conditioning system from the engine compartment.

30. A preassembled vehicle cockpit according to claim 29 wherein the air conditioning system includes a filter.

31. A preassembled vehicle cockpit according to claim 27 wherein the air distribution system is comprised of two thin shaped shells that are interconnected by a rigid foam body.

32. A preassembled vehicle cockpit according to claim 22 wherein a constructional unit including a steering column is mounted on the lower surface of the structural planar profiled member via metal-resilient connections.

33. A preassembled vehicle cockpit according to claim 22 wherein one of the functional and operating elements is a glove box that is secured on the lower surface of the structural planar profiled member.

34. A preassembled vehicle cockpit according to claim 22 wherein one of the functional and operating elements is a visible shell for the cockpit that is secured on the upper surface of the structural planar profiled member.

35. A preassembled vehicle cockpit according to claim 22 wherein an airbag is mounted on the upper surface of the structural planar profiled member.

36. A preassembled vehicle cockpit according to claim 35 wherein a visible shell is mounted on the upper surface of the structural planar profiled member and conceals the air bag.

37. A preassembled vehicle cockpit according to claim 36 wherein said visible shell defines a rupturable covering for deployment of the air bag.

38. A preassembled vehicle cockpit according to claim 36 wherein the visible shell includes a stationary part and a hinged movable part, the movable part concealing the air bag.

39. A preassembled vehicle cockpit according to claim 38 further including a sensor for sensing said frontal impact, and a release mechanism, being actuated responsive to the sensor sensing said frontal impact of a pre-determined strength, to release and enable pivoting of the movable part of the visible shell to expose the air bag.

40. A preassembled vehicle cockpit according to claim 39 wherein the movable part, when pivoted, is positioned behind the windscreen and in front of the passenger area in the vehicle.

41. A preassembled vehicle cockpit according to claim 40 further including an inflatable air hose located in the movable part of the visible shell that deploys when the air bag is deployed.

42. A preassembled vehicle cockpit according to claim 36 wherein the visible shell extends vertically and the stationary part is a lower part and the movable part is an upper part hinged to the lower stationary part.

43. Vehicle cockpit on a vehicle having a passenger area, a front windscreen having a lower edge and an engine compartment, the cockpit, comprising, extending below the lower edge of the front windscreen, a box section of a bodywork, which is completed by a cross-member to form a closed system, the vehicle cockpit further comprising: a flat shaped piece mounted between the box-section and the cross-member and constituting a pre-assembled fitted unit having mounted thereon a visible shell, an air conditioning system and functional and operational elements, said flat shaped piece coupled to the box-section and the cross-member so as to absorb, energy in the event of a vehicle frontal impact, the air conditioning system being divided into a fan unit disposed in the engine compartment, at least encompassing a fan motor, a fan, and a housing, and into an air conditioning unit which is disposed in the passenger area, the air conditioning unit containing functional planes disposed vertically one above the other and extending approximately horizontally, to form, respectively, subassemblies that combine identical functions.

44. Vehicle cockpit according to claim 43 characterised in that the bodywork has A-columns and at least the cross member is secured to the bodywork in the region of the A-columns with the aid of tolerance-compensating sloping surfaces.

45. Vehicle cockpit according to claim 44, characterised in that, on an upper side of the shaped piece, an air conduction system is arranged securely mounted, and on an underside of the shaped piece the air conditioning unit is securely mounted, whilst a steering column, pedals and a support portion are pre-assembled with the aid of flexible constructional elements to the underside of the shaped piece and are fixed to a front wall of the passenger area.

46. Vehicle cockpit according to claim 44, characterised in that a glove compartment is securely mounted as a complete unit to a lower side of the shaped piece.

47. Vehicle cockpit according to claim 44, characterised in that the shaped piece bears all the functional and operational elements and the visible shell has only a covering function.

48. Vehicle cockpit according to claim 44, characterised in that the visible shell includes at least two thin shaped shells connected to one another, to form an air conduction system, and a voluminous rigid-foam body covering and connecting said two thin shaped shells, wherein a visible side of the rigid-foam body is covered with a lining backed by a flexible foam.

49. Vehicle cockpit according to claim 48, characterised by the visible shell being comprised of a support shell, formed from a wood-fibre moulding material and the rig-foam body is formed from dimensionally stable particle foam.

50. Vehicle cockpit according to claim 48, characterised in that the rigid-foam body contains a guide channel, formed by shaped pieces, for an airbag, and a covering of the guide channel being configured as an invisible airbag covering.

51. Vehicle cockpit according to claim 48, characterised in that the air conduction system of the visible shell is directly connected in a sealed manner to an air exit aperture of a support housing of the air conditioning system.

52. Vehicle cockpit according to claim 43, characterised in that the visible shell consists of an upper and a lower shell, the upper shell being secured pivotally and being able to be swiveled in the event of said frontal impact of predetermined minimum strength in front of the front windscreen on the vehicle in such a way that the upper shell clears an aperture for an airbag to pass through, and the lower shell remains stationary.

53. Vehicle cockpit according to claim 52, further including an airbag, and wherein the swiveling of the upper shell is responsive to unfolding of the airbag, and the upper shell is then held in an open position.

54. Vehicle cockpit according to claim 53, wherein the upper shell is comprised of a rigid-foam body and a lining backed with flexible foam, the airbag is arranged to inflate in a region of a possible head impact with the rigid-foam body, and the lining backed with flexible foam of the visible shell is provided with a preformed tear seam.

55. Vehicle cockpit according to claim 43, characterised in that a support housing of the air conditioning system is configured self-supporting and has at least one filter that is easily accessible from the engine compartment.

56. Vehicle cockpit according to claim 43, characterised in that the box-section of the bodywork is designed to draw water from the front windscreen.

57. Vehicle cockpit on a vehicle having a front windscreen having a lower edge, a passenger area and an engine compartment, the cockpit comprising, extending below the lower edge of the front windscreen, a box-section of a bodywork, a cross-member coupled to the box-section to form a closed system, the vehicle cockpit further comprising: a flat shaped piece on which is mounted a visible shell, an air conditioning system and functional and operational elements, as a pre-assembled fitted unit, said flat shaped piece being mounted between the box-section and the cross-member and being coupled to the box-section and the cross-member so as to absorb energy in the event of a vehicle frontal impact, and a support housing of the air conditioning system configured self-supporting and having at least one filter that is easily accessible from the engine compartment.

* * * * *